US005386335A

United States Patent [19]

Amano et al.

[11] Patent Number: 5,386,335

[45] Date of Patent: Jan. 31, 1995

[54] SURGE ABSORBER

[75] Inventors: Toshinori Amano; Seiji Sakai; Yasuo Fujiki; Masanori Ueyama; Yukio Sakamoto; Daisuke Takagi, all of Nagaokakyo, Japan

[73] Assignee: Murata Manufacturing Co., Ltd., Kyoto, Japan

[21] Appl. No.: 913,956

[22] Filed: Jul. 17, 1992

[30] Foreign Application Priority Data

| | | | |
|---|---|---|---|
| Jul. 18, 1991 | [JP] | Japan | 3-64091[U] |
| Jul. 18, 1991 | [JP] | Japan | 3-203327 |
| Jul. 23, 1991 | [JP] | Japan | 3-207390 |
| Jul. 24, 1991 | [JP] | Japan | 3-182776 |
| Aug. 30, 1991 | [JP] | Japan | 3-77686[U] |
| Apr. 22, 1992 | [JP] | Japan | 4-103126 |

[51] Int. Cl.$^{6}$ .......... H02H 9/06

[52] U.S. Cl. .......... 361/56; 361/111; 361/119; 338/20

[58] Field of Search .......... 361/55, 56, 104, 119, 361/103, 125; 338/20

[56] References Cited

U.S. PATENT DOCUMENTS

| | | | |
|---|---|---|---|
| 4,198,613 | 4/1980 | Whitley | 333/181 |
| 4,695,916 | 9/1987 | Satoh et al. | 361/56 |
| 5,034,709 | 7/1991 | Aeumi et al. | 333/184 |
| 5,146,200 | 9/1992 | Heilmann et al. | 338/21 |
| 5,155,649 | 10/1992 | Hung et al. | 361/119 |

*Primary Examiner*—A. D. Pellinen
*Assistant Examiner*—Sally Medley
*Attorney, Agent, or Firm*—Wenderoth, Lind & Ponack

[57] ABSTRACT

In a surge absorber, capable of suppressing a voltage surge and a current surge together without interrupting a signal transmission, an input electrode and an output electrode are spaced apart on the surface of a varistor substrate, and a resistance element is connected between the electrodes. A ground electrode is provided on the reverse side of the varistor substrate so as to face the input electrode with the varistor element therebetween. Thereby, a varistor element is formed by the input electrode and the ground electrode where a voltage surge and a current surge can be suppressed by the resistance element, and where a signal waveform is not weakened by capacitance of the varistor element, and ordinary signal transmission is not interrupted.

7 Claims, 8 Drawing Sheets

SURGE ABSORBER

FIELD OF THE INVENTION

The present invention relates to a surge absorber and more particularly to a surge absorber capable of suppressing an extraneous voltage surge and current surge together without interrupting an ordinary signal transmission.

PRIOR ART

As shown in FIG. 32, if a general varistor element 1 for protecting against an extraneous surge which enters into a signal line is connected to a signal line A—A', although a voltage surge V can be suppressed by the varistor element 1, a current surge I cannot be suppressed.

Thus, as shown in FIG. 33, in order to suppress not only a voltage surge but also a current surge, a three-terminal surge absorber with a built-in resistance is suggested.

As shown in FIG. 33(*a*), in the structure of the surge absorber, an input electrode 103 and an output electrode 104 are provided in a divided manner on the surface of a varistor substrate 102, and a resistance element 105 is connected between the input electrode 103 and the output electrode 104. As shown in FIG. 33(*b*), a ground electrode 106, an area of which corresponds to a total area of the input electrode 103 and the output electrode 104, is provided on the reverse side of the varistor substrate 102 such that the varistor substrate is between the ground electrode 106 and the input and output electrodes 103, 104. A lead terminal 107 is connected to the input electrode 103, a lead terminal 108 is connected to the output electrode 104 and a lead terminal 109 is connected to the ground electrode 106.

The above described conventional surge absorber has the following problem; since the ground electrode 106 is provided so as to oppose both the input electrode 103 and the output electrode 104, as shown in an equivalent circuit in FIG. 34, two varistor elements 110 and 111 exist with a resistance element 105 therebetween, and as shown in FIG. 35, a signal wave form to be transmitted by a signal line is weakened or not transmitted due to a capacitance $C_2$ of the varistor element 111 on the side of the output electrode 104 and a time constant of a resistance value R of the resistance element 105.

Further, if an electronic part having a lead terminal is mounted on a printed wiring plate by using an automatic insertion machine, the electronic part with its lead terminal held by a carrier tape is set in a stocker. However, since extended parts of the lead terminal of the above surge absorber are not disposed on the same level, it is difficult to hold the surge absorber with a carrier tape and an automatic insertion machine cannot be used easily.

SUMMARY OF THE INVENTION

Under the above circumstances, the first object of the present invention is to provide a surge absorber capable of suppressing a voltage surge and a current surge together without interrupting a signal transmission.

The second object of the present invention is to provide a surge absorber with a large withstand voltage and a large withstand current which can be set in an automatic insertion machine easily and can be manufactured at a low cost.

The third object of the present invention is to provide a surge absorber which can be subjected to a surface-mounting and is small and takes little space.

The fourth object of the present invention is to provide a surge absorber in which a resistor can be formed easily and by which an exact resistance value can be obtained with certainty.

BRIEF DESCRIPTION OF THE DRAWINGS

The foregoing and other objects of the present invention will be understood in detail from the following explanation by referring to the following accompanying drawings.

Figure 20:
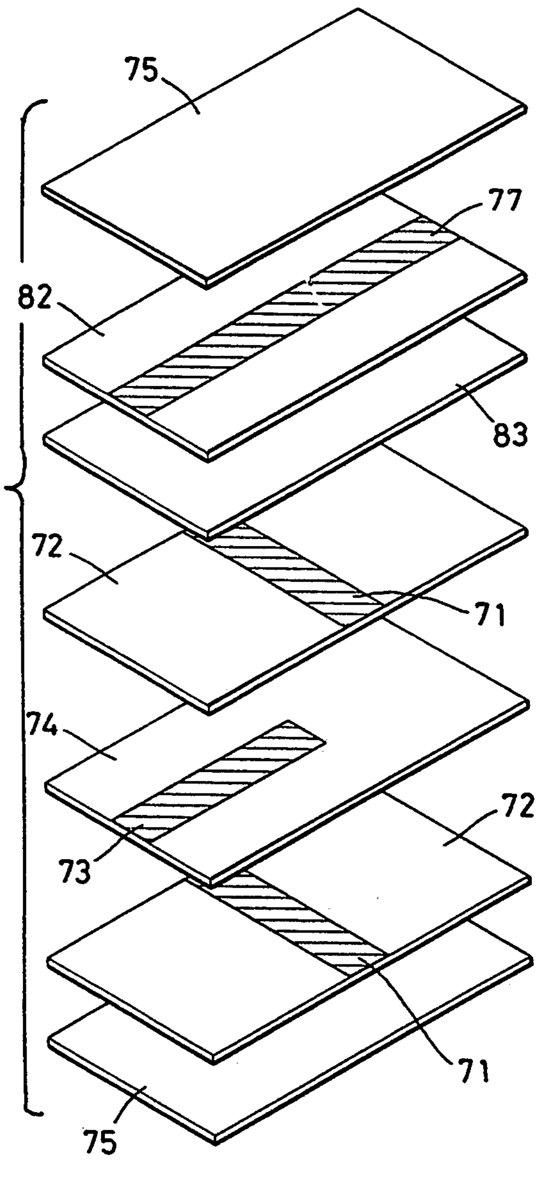
FIG. 20 is an exploded perspective view showing a twelfth example of a surge absorber in accordance with the present invention.
Figure 21:
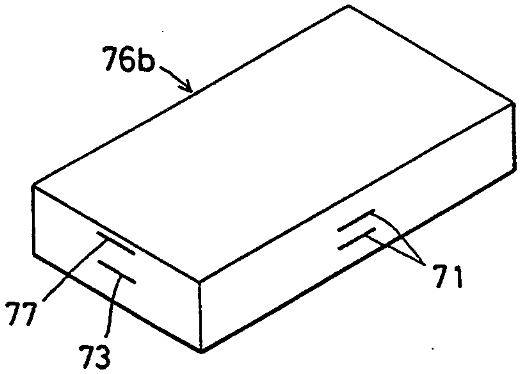

The surge absorber of FIG. 21 is a perspective view showing FIG. 20 under a pressure-baking condition.

Figure 22:
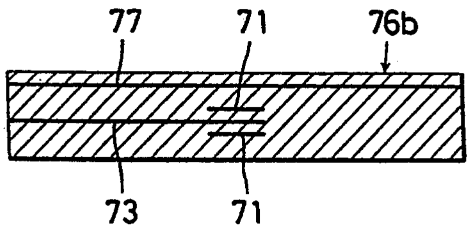

FIG. 22 is a vertical sectional view of FIG. 21.

Figure 23:
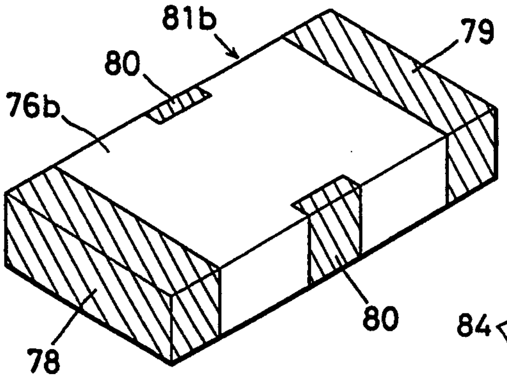

FIG. 23 is a perspective view of FIG. 21 on which external electrodes are provided.

Figure 24:
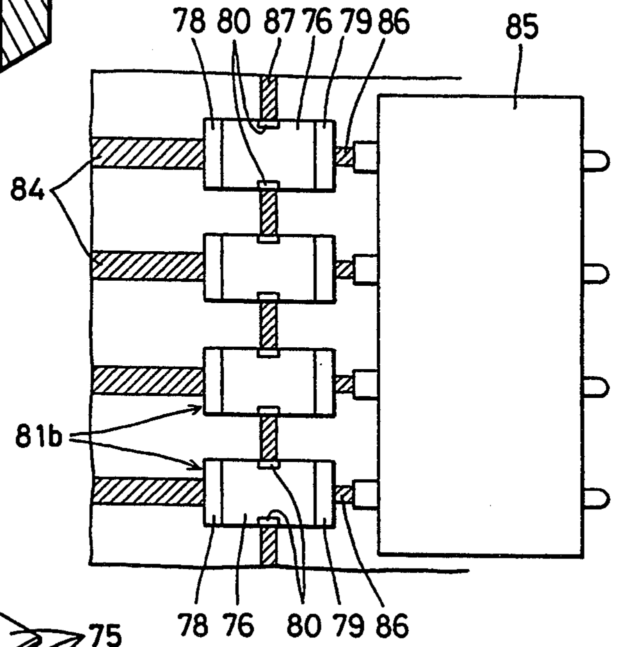

FIG. 24 is a plan view showing the above surge absorber under a mounted condition.

Figure 25:
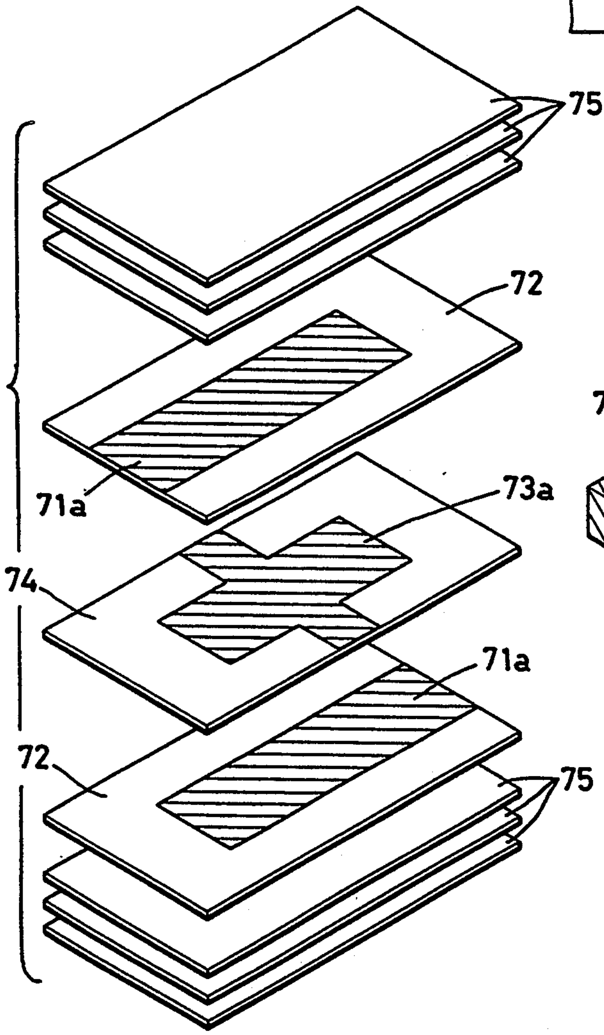

FIG. 25 is an exploded perspective view showing a thirteenth example of a surge absorber.

Figure 26:
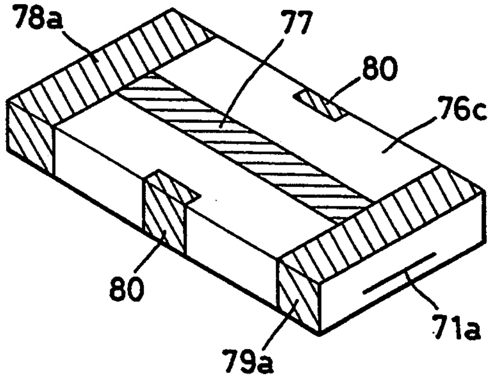

FIG. 26 is a perspective view showing an external appearance of the above surge absorber.

FIG. 27(*a*) is a left side view of the surge absorber shown in FIG. 26, and FIG. 27(*b*) is a right side view thereof.

Figure 28:
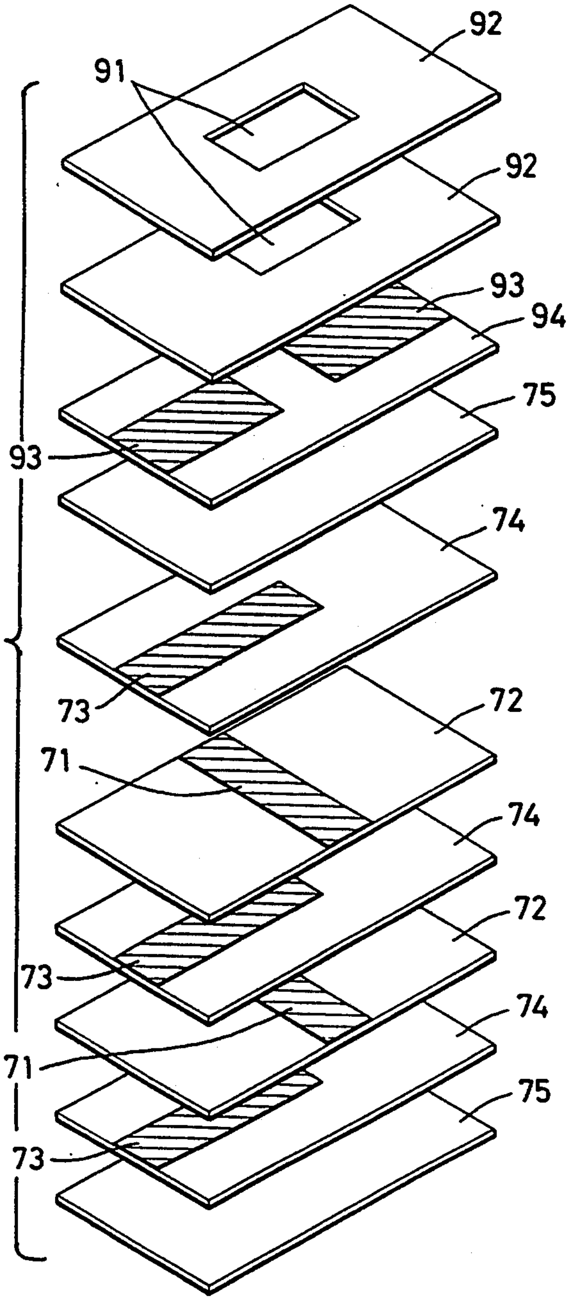

FIG. 28 is an exploded perspective view showing a fourteenth example of a surge absorber.

Figure 29:
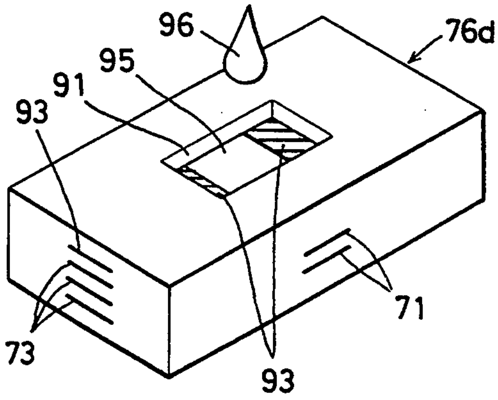

FIG. 29 is a perspective view showing a pressure-baked laminated member of a surge absorber in accordance with the present invention.

Figure 30:
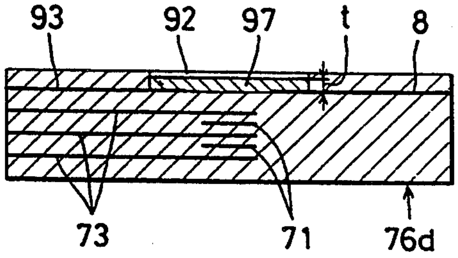

FIG. 30 is a sectional view of a pressure-baked laminated member of a surge absorber in accordance with the present invention.

Figure 31:
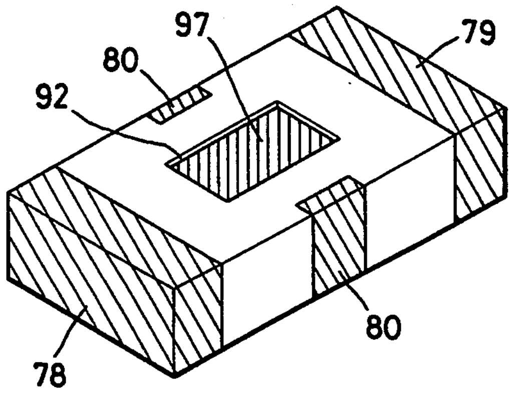

FIG. 31 is a perspective view showing a laminated member on which external electrodes are provided.

Figure 32:
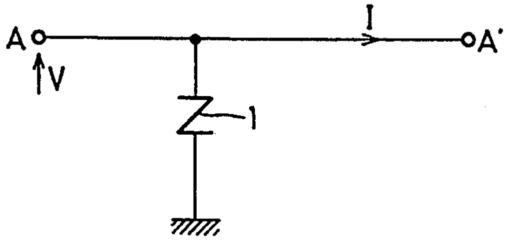
FIG.32 PRIOR ART

FIG. 32 is a conventional circuit diagram of a circuit which absorbs a voltage surge.

Figure 33A:
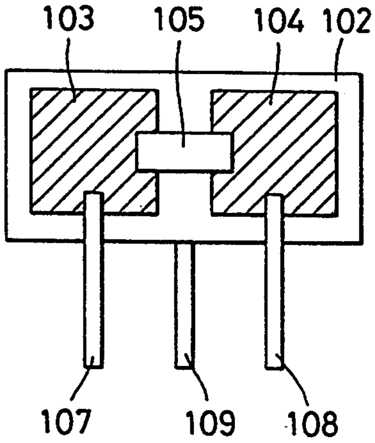
FIG. 33(a) PRIOR ART
Figure 33B:
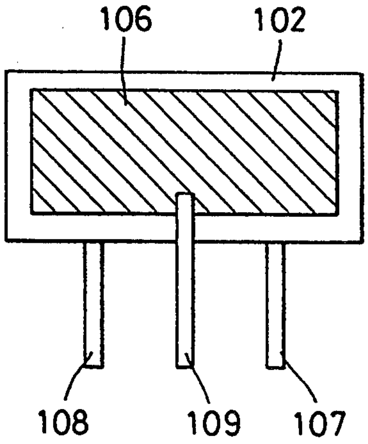
FIG. 33(b) PRIOR ART

FIG. 33(*a*) is a front view showing a conventional surge absorber, and FIG. 33(*b*) is a rear elevation thereof.

Figure 34:
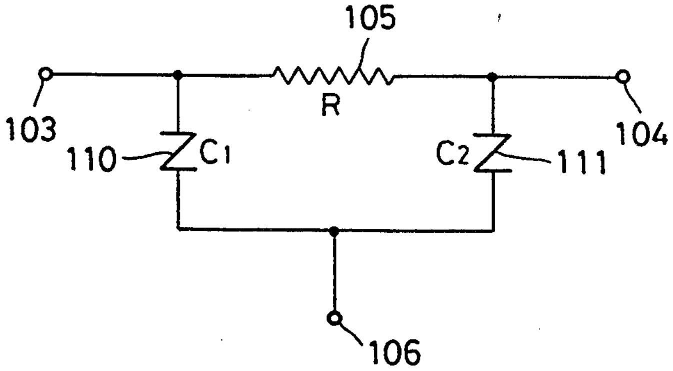
FIG.34 PRIOR ART

FIG. 34 is an equivalent circuit diagram of a conventional surge absorber.

Figure 35:
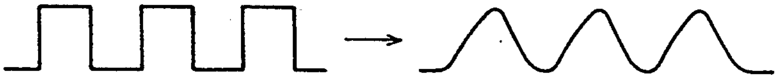
FIG.35 PRIOR ART

FIG. 35 is an explanatory view showing a change of a signal waveform.

In each of the examples explained in the following, a resistance is connected between an input and an output and each of the examples has an equivalent circuit which is grounded by a varistor element which is closer to the input side than the resistance. Each of the first to seventh examples, shown in FIGS. 1–11, shows a surge absorber with lead terminals which uses a varistor substrate.

DETAILED DESCRIPTION OF THE PREFERRED EMBODIMENTS

Figure 1A:
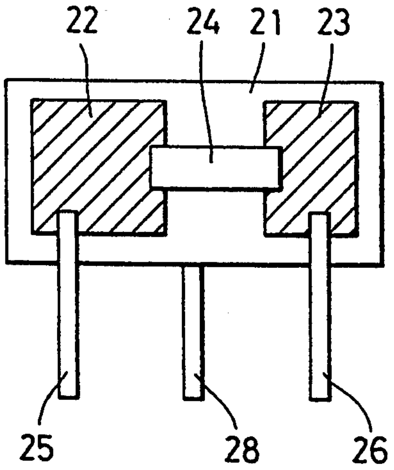
FIG. 1(*a*) is a front view showing a first example of a surge absorber in accordance with the present invention, and FIG. 1(*b*) is a rear elevation thereof.
Figure 1B:
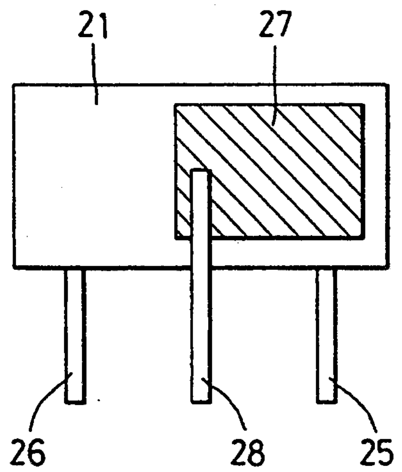

First, in the first example shown in FIGS. 1(*a*) and (*b*), an input electrode 22 and an output electrode 23 are provided in a divided manner (i.e. spaced apart from one another) on the surface of a varistor substrate 21, a resistance element 24 is provided between the divided input electrode 22 and output electrode 23, an input terminal 25 is connected to the input electrode 22 and an output terminal 26 is connected to the output electrode 23, respectively. On the reverse side of the above mentioned varistor substrate 21, as shown in FIG. 1(*b*), a ground electrode 27 facing only the input electrode 22 with the varistor substrate 21 therebetween is provided and a ground terminal 28 is connected to the ground electrode 27.

The above mentioned output electrode 23 is used only to connect the output terminal 26 and the resistance element 24, and an electrode area of the output electrode 23 is formed smaller than that of the input electrode 22. Also the ground electrode 27 is formed so as to have a part to which the ground terminal 28 is connected in addition to an area which faces the input electrode 22, but the ground electrode 27 does not face the output electrode 23.

Figure 2:
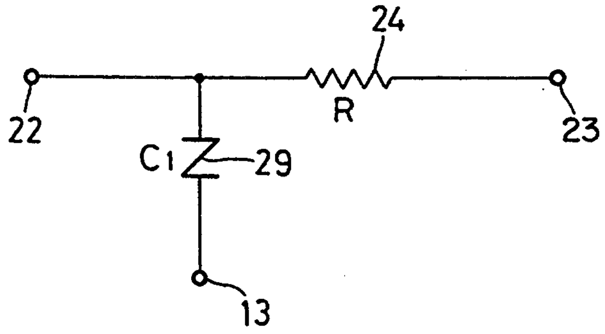
FIG. 2 is an equivalent circuit diagram of a surge absorber in accordance with the present invention.

Since the input electrode 22 and the ground electrode 27 face each other with the varistor substrate 21 therebetween and the output electrode 23 is independent, a surge absorber having the above described structure results in a structure having a resistance element 24 and a varistor element 29 formed by the input electrode 22 and the ground electrode 27, as shown by an equivalent circuit in FIG. 2.

Figure 3A:
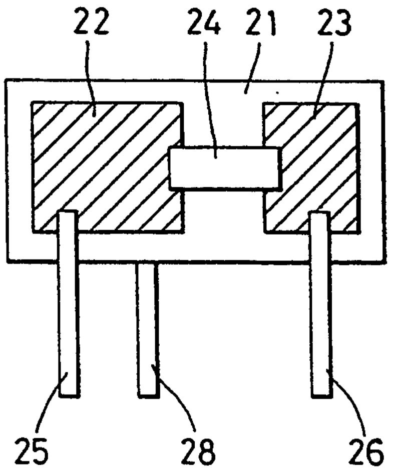
FIG. 3(*a*) is a front view showing a second example of a surge absorber in accordance with the present invention, and FIG. 3(*b*) is a rear elevation thereof.
Figure 3B:
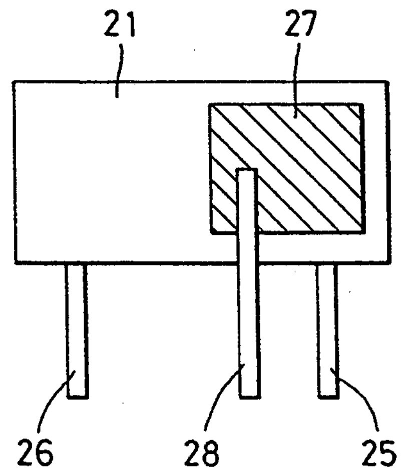

Next, in the second example shown in FIGS. 3(*a*) and (*b*), the area of the ground electrode 27 is smaller and the ground terminal 28 is closer to the input terminal 25 compared with the first example.

By the above structure, an offset quantity of the ground electrode 27 can be increased and stray capacity which tends to be generated between the ground electrode 27 and the output electrode 23 can be reduced, and further, a direction is indicated for the absorber due to the different intervals between the terminals 25 and 28 and between the terminals 26 and 28, and as a result a misconnection can be prevented.

Figure 4A:
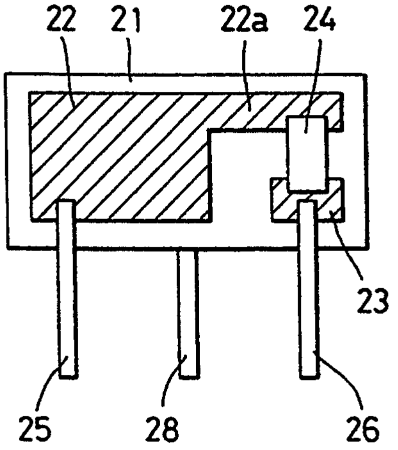
FIG. 4(*a*) is a front view showing a third example of a surge absorber in accordance with the present invention, and FIG. 4(*b*) is a rear elevation thereof.
Figure 4B:
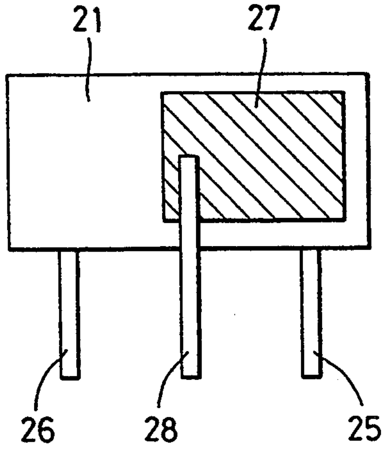

In the third example shown in FIGS. 4(*a*) and (*b*), an elongated part 22*a* is provided at the upper side of the input electrode 22, and the resistance element 24 is provided between the elongated part 22*a* and the output electrode 23 which is spaced below the elongated part 22*a*.

Figure 5A:
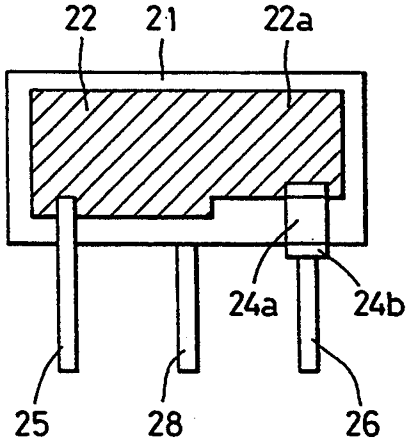
FIG. 5(*a*) is a front view showing a fourth example of a surge absorber in accordance with the present invention, and FIG. 5(*b*) is a rear elevation thereof.
Figure 5B:
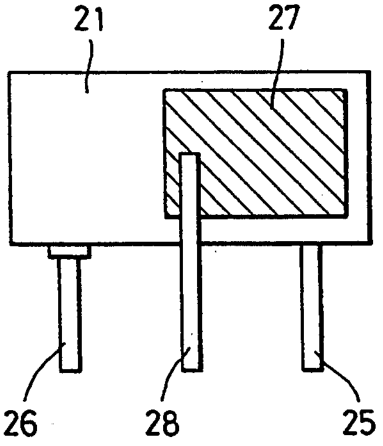

In the fourth example shown in FIGS. 5(*a*) and (*b*), the elongated part 22*a* is provided for the input electrode 22, and a chip resistance element 24*a* is connected to the elongated part 22*a*, and an external electrode 24*b* of the chip resistance element 24*a* is used for an output electrode and since an output electrode is not provided on the surface of the varistor substrate 21, the stray capacity between the ground terminal 28 and the output terminal 26 is eliminated.

Figure 6A:
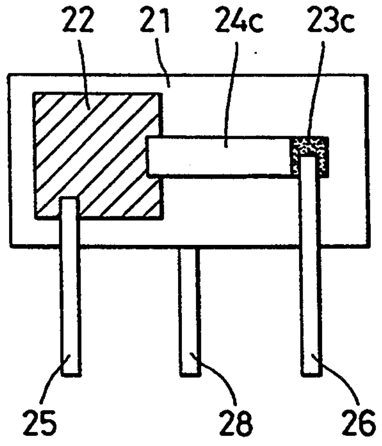
FIG. 6(*a*) is a front view of a fifth example of surge absorber in accordance with the present invention, and FIG. 6(*b*) is a rear elevation thereof.
Figure 6B:
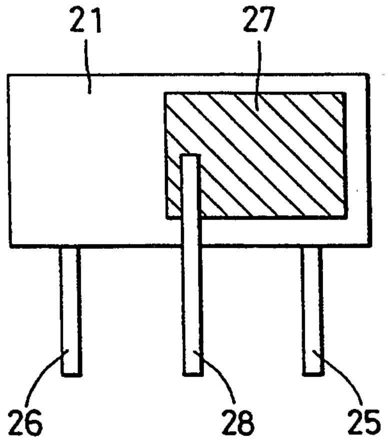

In the fifth example shown in FIGS. 6(*a*) and (*b*), a resistance element 24*c* formed by applying and baking a resistance material in paste is provided on the surface of the varistor substrate 21. One end part of the resistance element 24*c* overlaps with the input electrode 22, an output electrode 23*c* formed by applying and baking as well is provided on the other end part, and the output terminal 26 is connected to the output electrode 23*c*.

The circuits of the second to fifth examples result in the same equivalent circuit as shown in FIG. 2. In each of these examples a component of the varistor substrate 21, a material and a method of forming each electrode and a type and a method of forming a resistance element can be selected freely.

As mentioned above, the first to fifth examples result in structures having equivalent circuits as shown in FIG. 2, by providing a varistor element and a resistance element on a varistor substrate. Thus, a voltage surge and a current surge are suppressed together and an internal circuit is protected, and a signal waveform to be transmitted is not weakened and an ordinary signal transmission is not interrupted since capacitance of the varistor element does not appear as stray capacity on the output side.

Next, the sixth example and seventh example shown in FIG. 7 to FIG. 11 are modified examples of the first to the fifth examples described above and a resistance element separate from a varistor substrate is used therein.

Figure 7:
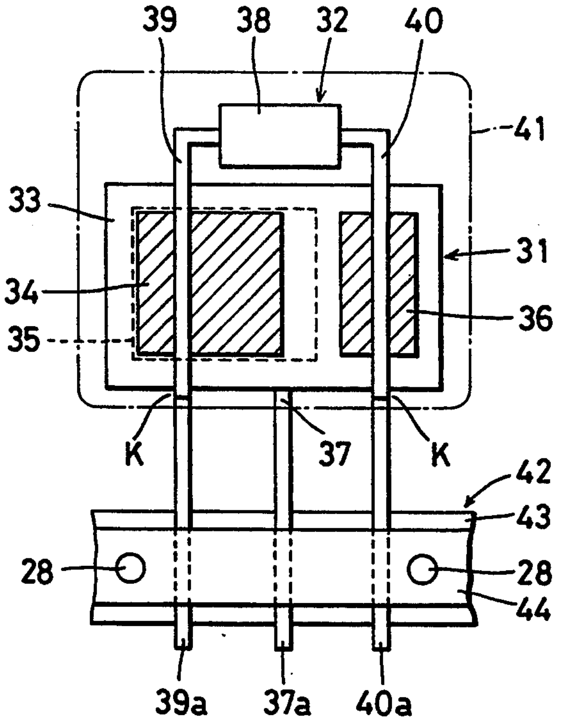
FIG. 7 is a plan view showing a sixth example of a surge absorber in accordance with the present invention.
Figure 9:
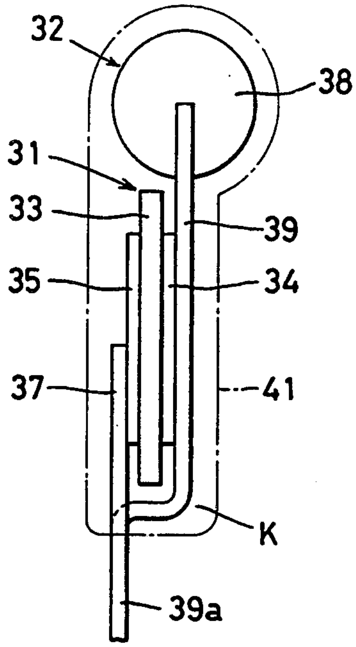
FIG. 9 is a left side view showing a surge absorber shown in FIG. 7.
Figure 8:
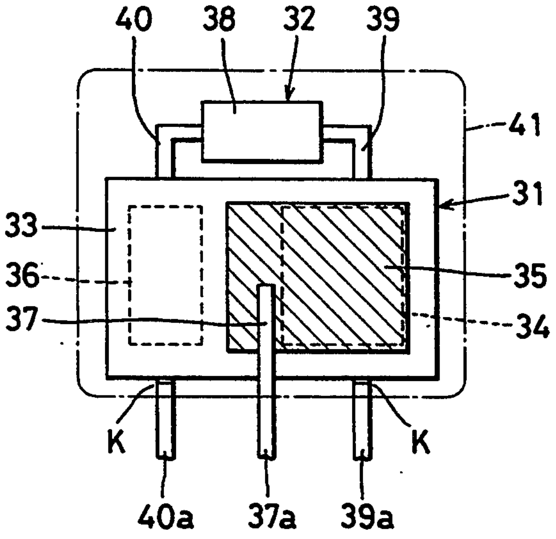
FIG. 8 is a reverse side view of the surge absorber shown in FIG. 7.

In the sixth example, as shown in FIG. 7 to FIG. 9, a surge absorber comprises a varistor element 31 and a resistance element 32 as a passive element with lead terminals. The varistor element 31 comprises a varistor substrate 33, varistor electrodes 34, 35 provided on the opposing surfaces of the varistor substrate 33 by means of a silver deposition etc. and a dummy electrode 36. The varistor electrodes 34, 35 are located so as to face each other with the varistor substrate 33 therebetween. A common lead terminal 37 is electrically connected and fixed to the varistor electrode 35 by means of soldering etc. The varistor substrate consists of ceramic made from main materials such as zinc oxide and strontium titanate.

The resistance element 32 is a well known discrete type resistance element and consists of a resistance body part 38 and lead terminals 39, 40 extending from opposing ends of the body part 38. The resistance element 32 is bent into a U-shape and the body part 38 is disposed in a place facing the upper end surface of the varistor substrate 33. The lead terminals 39, 40 are arranged in the same direction as the lead terminal 37 and are electrically connected and fixed to the varistor electrode 34 and the dummy electrode 36 by means of soldering etc., respectively. Further, the lead terminals 39, 40 are bent at a part K along the bottom end surface of the varistor substrate 31, and extended parts 39*a*, 40*a* are disposed on the same level with an extended part 37*a* of the common lead terminal 37.

A combination of the varistor element 31 with the resistance element 32 is armored with an insulating resin etc. and is finalized by covering the varistor element 31 and the body part 38 of the resistance element 32 with an armor (or coating) 41. Since the resistance element 32 has a larger withstand voltage and withstand current compared with a conventional resistance film, the function of this surge absorber to protect an electronic apparatus against a surge voltage is improved. Moreover, since the lead terminals 39, 40 of the resistance element 32 can be used as lead terminals of the surge absorber, the cost of manufacture is lowered. Further, since the extended parts 37*a*, 39*a* and 40*a* of the lead terminals 37, 39 and 40 are disposed on the same level, as shown in FIG. 7 these extended parts 37*a*, 39*a* and 40*a* can be easily held by a carrier tape 42. Therefore, varistor parts being held by the carrier tape 42 are set in a stocker of an automatic insertion machine and inserted automatically into a printed wiring plate etc. The carrier tape 42 comprising a cardboard member 43 and an adhesive tape 44 is well-known and holds a surge absorber by putting the lead terminals 37, 39 and 40 between the cardboard 43 and the adhesive tape 44. Feed holes 28 are provided on the carrier tape 42 at regular intervals. Furthermore, since the body part 38 of the resistance element 32 is positioned to face the upper end surface of the varistor substrate 33, a thickness the surge absorber can be made thinner. A surge absorber obtained according to the above description results in the same equivalent circuit as shown in FIG. 2.

Figure 10:
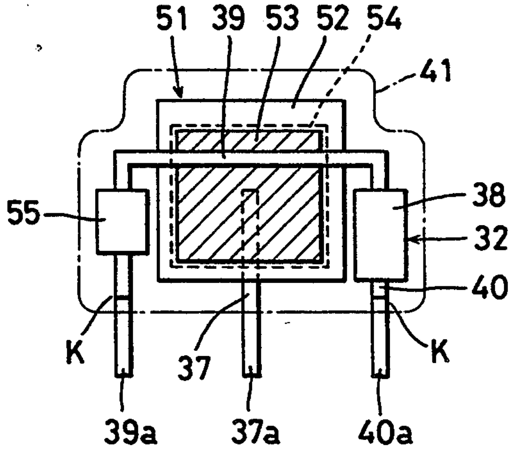
FIG. 10 is a plan view showing a seventh example of a surge absorber in accordance with the present invention.

The seventh example is a three-terminal surge absorber with a built-in ferrite bead 55 and element 32 and, as shown in FIG. 10, a varistor element 51 comprises a varistor substrate 52 and varistor electrodes 53, 54 provided on the opposing surfaces of the substrate 52. The varistor electrodes 53 and 54 are located so as to face each other with the varistor substrate 52 therebetween. The common lead terminal 37 is electrically connected and fixed to the varistor electrode 54 by means of soldering etc.

The ferrite bead 55 is mounted on the one lead terminal 39 of the resistance element 32. The body part 38 of the resistance element 32 is positioned to face the right end surface of the varistor substrate 52 and the ferrite bead 55 is positioned to face the left end surface of the varistor substrate 52. The lead terminal 39 is electrically connected and fixed to the varistor electrode 53 by means of soldering etc. The lead terminals 39, 40 are bent at the part K along the bottom end surface of the varistor substrate 52, such that the extended parts 39*a*, 40*a* are disposed on the same level with the extended part 37*a* of the common lead terminal 37.

A surge absorber obtained according to the above description provides a similar operation and effect to the above mentioned sixth example. In addition, a function of eliminating high-frequency noise and a function of preventing a signal waveform distortion such as overshoot, undershoot and ringing by an impedance matching of a transmitted signal are improved by the ferrite bead 55 being connected closer to the input side than the varistor element.

Figure 11:
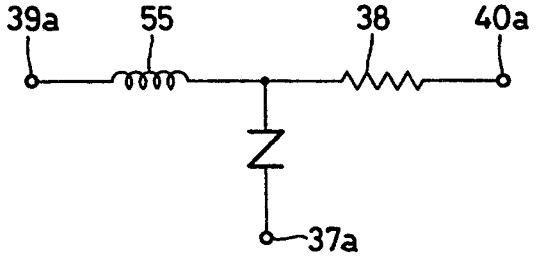
FIG. 11 is an equivalent electric circuit diagram of the surge absorber shown in FIG. 10.

FIG. 11 is an electric equivalent circuit diagram for the surge absorber of the seventh example.

According to the above sixth and seventh examples, by including a passive element with a lead terminal, a surge absorber having a built-in resistance and a built-in coil with large withstand voltage and withstand current capacitance can be obtained. As a result, a performance in protecting an electronic apparatus against a surge voltage is improved. Further, since the lead terminal of the passive element can be used as a lead terminal of the surge absorber, a surge absorber can be manufactured at a low cost. Moreover, since the body part of the passive element is positioned to face the end surface of the varistor element, an absorber can be made thinner and a compact surge absorber can be obtained.

Since it is easy to put the extended parts between the carrier tape by disposing the extended parts of all of the lead terminals on the same level, the surge absorber held by the carrier tape can be set in an automatic insertion machine.

Figure 12:
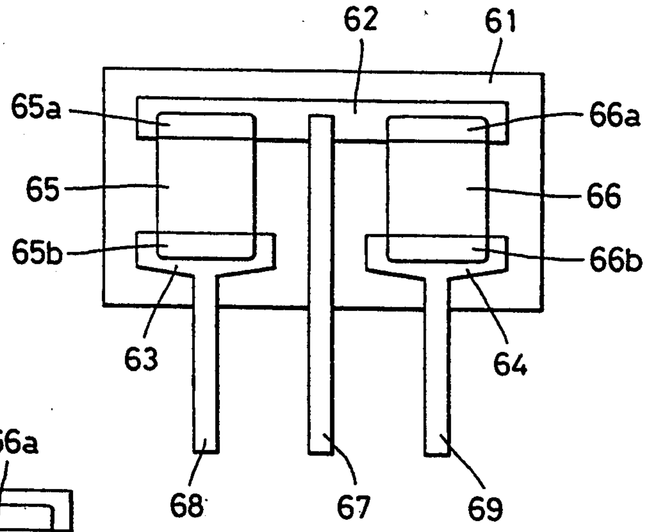
FIG. 12 is a front view showing a eighth example of a surge absorber in accordance with the present invention.
Figure 13:
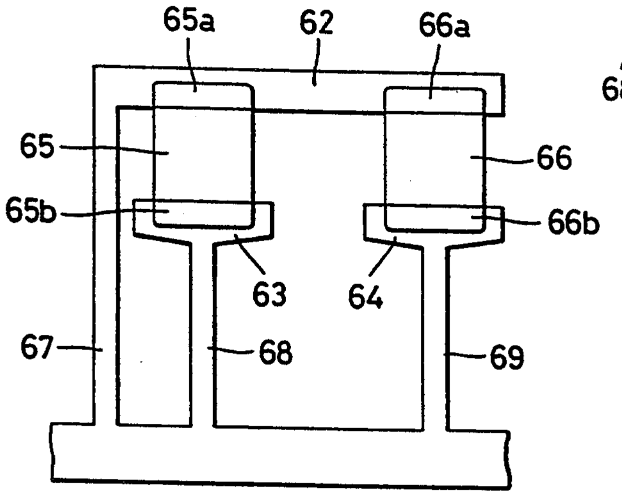
FIG. 13 is a front view showing a ninth example of a surge absorber in accordance with the present invention.
Figure 14:
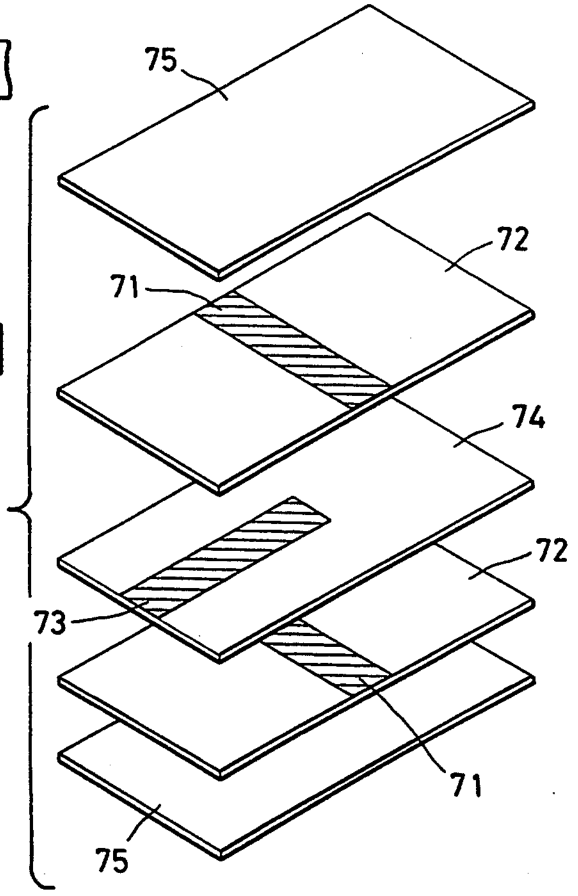
FIG. 14 is an exploded perspective view of parts which form a varistor element of a tenth example of a surge absorber in accordance with the present invention.

In the eighth and ninth examples shown in FIG. 12 and FIG. 13, a surge absorber consists of a chip varistor element and a chip resistance element etc. without employing a varistor substrate.

In the eighth example shown in FIG. 12, on the surface of an insulating substrate 61 employing alumina etc., an input electrode 62 which is elongated side-to-side is located at the upper part of the substrate, and a ground electrode 63 and an output electrode 64 located at both sides of the lower part of the substrate 61 in a spaced apart manner. A chip varistor element 65 is mounted between the input electrode 62 and the ground electrode 63, and a chip resistance element 66 is mounted between the input electrode 62 and the output electrode 64 on the surface of the insulating substrate 61, respectively.

The above mentioned input electrode 62 is a common electrode connected to the chip varistor element 65 and the chip resistance element 66, and an input terminal 67 is connected to the center part of the input electrode 62.

The chip varistor 65 is mounted on the insulating substrate 61 so that one terminal 65*a* is connected to the input electrode 62 and the other terminal 65*b* is connected to the ground electrode 63, and a ground terminal 68 is connected to the ground electrode 63.

In the same manner as for the chip varistor element 65, one terminal 66*a* is connected to the input electrode 62 and the other terminal 66*b* is connected to the output electrode 64, and the output terminal 69 is connected to the output electrode 64.

Next, in the ninth example shown in FIG. 13, the input electrode 62, the ground electrode 63 and the output electrode 64 are formed by a hoop terminal. The chip varistor element 65 is fitted between the input electrode 62 and the ground electrode 63, and the chip resistance element 66 is fitted between the input electrode 62 and the output electrode 64, as in the eighth example. If each of the terminals 67, 68, 69 is cut off at the base, a surge absorber can be obtained.

In the ninth example, each electrode is formed by the hoop terminal and the electrodes and the terminals are provided in one unit. However, each electrode can be formed by a metal plate and separate terminals can be connected thereto.

The surge absorber shown in each of the examples results in the equivalent circuit shown in FIG. 2 by the combination of single chip varistor element 65 and chip resistance element 66. A component and a method of forming the chip varistor element 65, and a type and a method of forming the resistance element 66 can be selected freely.

According to the above eighth and ninth examples, a surge absorber results in the structure wherein the chip varistor element 65 and the chip resistance element 66 are fitted to the common input electrode 62, a voltage surge and a current surge are suppressed together and the internal circuit is protected, a signal waveform is not weakened by the capacity of the varistor element, and ordinary signal transmission is not interrupted.

In each of the above mentioned examples, as with the seventh example shown in FIG. 10 and FIG. 11, a ferrite bead can be fitted closer to the input side than a varistor element and thereby a function of eliminating high-frequency noise can be improved.

Next, each of the tenth to the fourteenth examples shown in FIGS. 14 to 31 provides an example of a chip type surge absorber to embody the equivalent circuit shown in FIG. 2.

In the tenth example shown in FIGS. 14 to 18, in order to structure a chip type surge absorber with a built-in resistance, a varistor green sheet 72 in which an internal electrode 71 which reaches both side edges of the sheet 72 is provided, and a varistor green sheet 74 in which an internal electrode 73 which reaches one end part of the sheet 74 is provided. Varistor green sheets 75, 75 used as the upper and lower ends (or surfaces) in which no internal electrodes are formed are prepared, and the number and combination of each of these sheets are selected.

Figure 15:
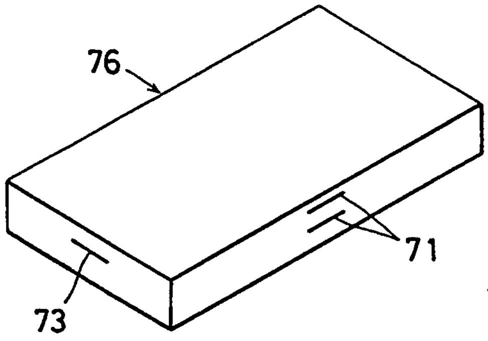
FIG. 15 is a perspective view showing a laminated member wherein the varistor element shown in FIG. 14 is pressure-baked.
Figure 16:
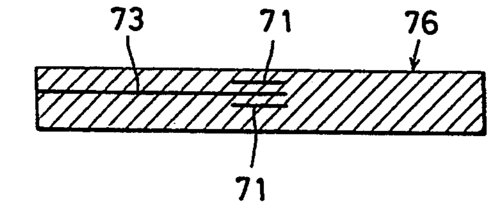
FIG. 16 is a vertical sectional view of the laminated member wherein the varistor element of the surge absorber shown in FIG. 15 is pressure-baked.

In the case shown in the drawings, two varistor green sheets 72, one varistor green sheet 74 and two varistor green sheets 75 used as the upper and lower ends are employed. These sheets are laminated in the vertical direction in the arrangement shown in FIG. 14, and are subjected to pressure-baking, to form a chip laminated member 76 as shown in FIG. 15 and FIG. 16.

For each varistor green sheet, for example, varistor materials of a ZnO system are used. For the internal electrodes 71, 73, materials such as Ag-Pd are used.

Figure 17:
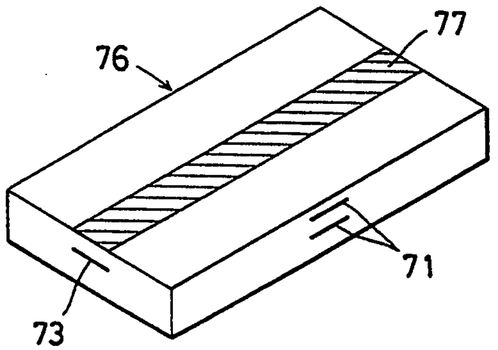
FIG. 17 is a perspective view of a laminated member on which a resistance electrode is provided.

As shown in FIG. 17, on one surface of the baked laminated member 76 a resistance electrode 77 is applied and baked so as to reach both ends of the surface. For the resistance electrode 77, materials such as carbon and cermet are used.

Figure 18:
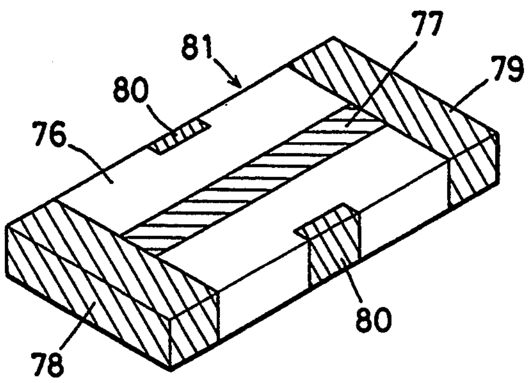
FIG. 18 is a perspective view of a surge absorber wherein external electrodes are provided on a laminated member.

Next, as shown in FIG. 18, external electrodes 78, 79, 80 are formed on the outside of both end parts and both middle parts of both the side surfaces of the laminated member 76 by plating or thick-film coating. The resistance electrode 77 can be formed after forming the external electrodes 78, 79, 80.

The external electrodes 78, 79 on both end parts are connected to the resistance electrode 77 and one external electrode 78 is further connected to the internal electrode 73. The external electrodes 80 at the middle parts of both side surfaces connect to the internal electrode 71 and thereby a varistor element Z is formed in the laminated part of the internal electrodes 71, 73. Further, a resistance element R is formed on the laminated member 76 by the applied and baked resistance electrode 77 and, as shown by the equivalent circuit in FIG. 2, a surge absorber 81 is provided with a built-in resistance wherein the varistor element $C_1$ and the varistor element R are provided in one chip type laminated member 76.

Figure 19:
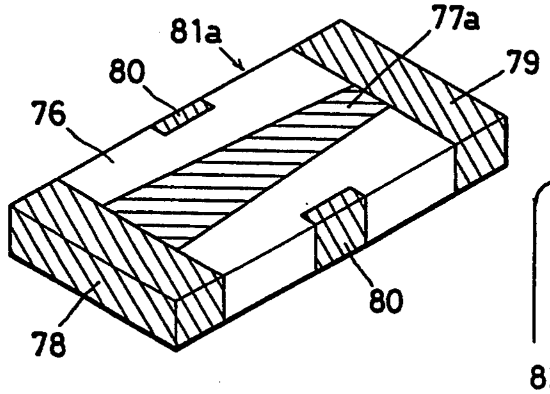
FIG. 19 is a perspective view showing an eleventh example of a surge absorber in accordance with the present invention.

Next, in the eleventh example shown in FIG. 19, a direction is indicated for an absorber due to the form of a resistance electrode. The eleventh example will be explained in the following by using the same reference for the same parts as in the tenth example.

A resistance electrode 77*a* consisting of materials such as a carbon and cermet is applied and baked on the baked laminated member 76 by the same method as the tenth example so as to reach both the end parts of the laminated member 76. The resistance electrode 77*a* is formed in a tapered shape so that one end part is narrow and the other end part is wide.

Needless to say, the resistance electrode 77*a* can be formed before or after forming the external electrodes 78, 79, 80. As mentioned above, a surge absorber 81*a* having the equivalent circuit shown in FIG. 2 can be obtained.

In the surge absorber 81*a*, since the resistance electrode 77*a* is tapered so that the width of the part of the resistance electrode 77*a* connecting with the external electrode 78 is wider than the width of the resistance electrode at the side of the other external electrode 79, a direction can be indicated for the absorber and the external electrode 78 connected to both the varistor element $C_1$ and the resistance element R can be visually distinguished from the external electrode 79 connected only to the resistance element R. Thus, when mounted on a printed substrate the absorber will not be mounted in the wrong direction.

The form of the resistance electrode 77*a* in the eleventh example is not limited to the tapered shape mentioned above, but rather other asymmetric forms of the resistance electrode are acceptable with the resistance electrode differing at the portion near the external electrode 78 and at the portion near the external electrode 79. In other words, other asymmetric forms are acceptable if a direction can be indicated for the surge absorber.

Next, the twelfth example shown in FIG. 20 to FIG. 24 is formed by incorporating a resistance element within a chip laminated member and by baking all in one. The twelfth example will be explained in the following by using the same reference numeral for the same parts as in the tenth example.

As shown in FIG. 20, a varistor green sheet 82 on the surface of which a resistance electrode 77 of nichrome etc. is applied and formed so as to reach both end parts and a varistor green sheet 83 for the middle are added to the tenth example. These sheets are laid one on top of another and laminated vertically in the arrangement shown in FIG. 20, and the laminated sheets are subjected to a pressure-baking and thereby a chip laminated member 76b as shown in FIG. 21 and FIG. 22 is formed.

As shown in FIG. 23, if the external electrodes 78, 79, 80 are formed on the outside of both end parts and both middle parts of the side surfaces of the above laminated member 76b, the external electrodes 78, 79 at both end parts connected to the resistance electrode 77, and one external electrode 78 is connected to the internal electrode 73. Further the external electrodes 80 at both the middle parts of the side surfaces are connected to the internal electrode 71.

According to the above, a surge absorber 81b can be obtained which has the equivalent circuit shown in FIG. 2 wherein the varistor element $C_1$ and the resistance element R are built in within the chip laminated member 76b.

FIG. 24 shows the above surge absorber 81b mounted on a printed substrate. The external terminal 78 at one end is connected to a signal pattern 84, and the external terminal 79 at the other end is connected to a pin 86 of an IC 85. The external electrodes 80 at the middle of both side surfaces are connected to a ground pattern 87, a voltage surge to the IC 85 is suppressed by the varistor element $C_1$ and a current surge is suppressed by the resistance element R.

As mentioned above, since the surge absorber 81b has a three-terminal structure, as shown in FIG. 24, the surge absorber 81b can be mounted on a joint of the pin 86 of the IC 85 in series and takes up little space.

Since the surge absorbers 81, 81a and 81b in the tenth to twelfth examples employ the laminated structure, the properties of the varistor element $C_1$ and the resistance element R can be regulated independently by controlling a pattern area of the internal electrode, the number of laminations, the thickness of the sheets and the pattern area of the resistance electrode.

According to the tenth to twelfth examples, the varistor element and the resistance element can be structured within one chip laminated member and, as a result, little space is taken up and the cost can be reduced, when such surge absorbers are mounted on the printed substrate.

Since the three-terminal laminated structure is employed, the properties of the varistor element and the resistance element can be controlled by a pattern area of the internal electrode and the resistance electrode, the number of lamination of the internal electrode and the thickness of the sheets, respectively.

Next, a thirteenth example is shown in FIG. 25 to FIG. 27 and is a modified example of the above mentioned tenth example. A pattern of the internal electrode is different, the form of the external electrode is modified, and a direction for the surge absorber is indicated.

In the thirteenth example, an internal electrode 73a of the varistor sheet 74 which is located at the middle is formed so as to reach both side edges, and internal electrodes 71a, 71a in the upper and lower varistor sheets 72, 72 are formed so as to reach respective opposite end edges.

Figure 27A:
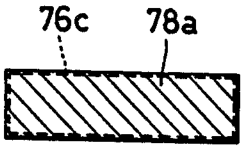
Figure 27B:
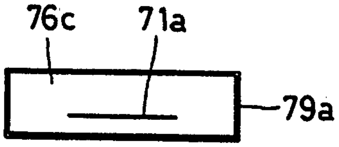

Further, as to the external electrodes formed on both the end parts of the laminated member 76c, as shown in FIG. 27a, one external electrode 78a is formed so as to reach around the outer peripheral surface and the end surface of the laminated member 76c and the other external electrode 79a is provided, as shown in FIG. 27(b), only on the outer peripheral surface of the end part of the laminated member 76a. Thus, a direction is indicated for the surge absorber due to the difference in the outer forms of the external electrodes 78a and 79a.

Next, a fourteenth example shown in FIG. 28 to FIG. 31 provides another example of a method for forming a resistance element in a chip type surge absorber.

In FIG. 28 to FIG. 31, in order to compose a varistor element, a varistor green sheet 72 on which the internal electrode 71 reaches both side edges is provided, a varistor green sheet 74 on which the internal electrode 73 reaches and one end part is provided, varistor green sheets 75, 75 having no internal electrodes therein and which form the upper and lower ends (or surfaces) are prepared, and the number and arrangement of these sheets are suitably selected.

Furthermore, in order to compose a resistance element, a green sheet 92 having a hole 91 and a green sheet 94 having electrodes 93, each of which reaches an opposing one of the end parts, are prepared. The electrodes 93, 93 of the green sheet 94 are formed so as to reach the hole 91 when laminated on the green sheet 92.

In the example shown in the drawings, two varistor green sheets 72, three varistor green sheets 74 and two varistor green sheets 75 used as the upper and lower ends are employed and further, two green sheets 92 and one green sheet 94 are employed. These sheets are laminated vertically by locating the hole 91 at the top in the arrangement shown in FIG. 28 and pressure baked. As a result the chip laminated member 76d as shown in FIG. 29 and FIG. 30 is formed.

As shown in FIG. 29, on the laminated member 76d after baking, resistance paste 96 extracted from a dispenser is injected into a concave 95 formed by the hole 91.

As shown by the sectional view in FIG. 30, the resistance paste 96 spreads in the concave 95 and forms a resistor 97. Since an area of the resistor 97 is fixed by the concave 95, the thickness t of the resistor 97 is fixed in proportion to a quantity of the paste 96 to be injected.

Since a resistance value is fixed according to the thickness t of the resistor 97, a quantity of the paste 96 is a quantity which supplies the thickness t corresponding to the resistance value, and if only a quantity of the paste extracted from a dispenser is controlled fixedly, the resistance value to be obtained is fixed.

Next, the external electrodes 78, 79, 80 are formed on both end parts and the middle of both the side surfaces by plating or covering with a thick film as shown in FIG. 31. The above mentioned paste 96 can be injected after forming the external electrodes 78, 79, 80.

The external electrodes 78, 79 at the end parts are connected to the resistor 97 through the electrodes 93, and one external electrode 78 is further connected to one internal electrode 73. The external electrodes 80 at the middle of the side surfaces are connected to the other internal electrode 71. Thus, a varistor element is formed on the laminated part of the internal electrodes 71, 73, and a resistance element is formed by the resistor 97 formed on the laminated member 76d and as a result, a surge absorber with a built-in resistance having the varistor element $C_1$ and the resistance element R on a chip laminated member 76d can be obtained.

Since the resistance element is formed by pouring a resistance paste into the concave on the laminated member, if only the quantity of the paste to be poured is fixedly controlled, a thickness of the resistor is fixed and an exact resistance value can be obtained and a property of the product is supplied with certainty. Further, since the resistor can be formed without relying on a printing method, the cost of production is reduced.

In the chip type surge absorber shown in the tenth to fourteenth examples, to color the external electrodes provided on opposing ends with a different color can be taken as a method of indicating direction.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A surge absorber comprising:
a resistance element having an input side and an output side;
a first electrode connected to the input side of said resistance element;
a second electrode connected to the output side of said resistance element;
a third electrode;
a varistor element interposed between said first electrode on the input side of said resistance element and said third electrode; and
wherein no capacitance element is interposed between the output side of said resistance element and said third electrode;
wherein said varistor element comprises a varistor substrate;
wherein said first and second electrodes are provided on said varistor substrate;
wherein said resistance element comprises a passive element which includes a body part and lead terminals extending from said body part;
wherein said body part of said passive element is positioned so as to face an end surface of said varistor substrate; and
wherein one of said lead terminals of said passive element is electrically connected to one of said first and second electrodes.

2. A surge absorber as recited in claim 1, wherein
an additional lead terminal is mounted to said varistor substrate;
each of said additional lead terminal and said lead terminals of said passive element has an extended portion which extends beyond an edge of said varistor substrate; and
all of said extended portions are disposed in a single plane.

3. A surge absorber as recited in claim 2, wherein
said first and second electrodes are mounted on a first surface of said varistor substrate;
said third electrode is mounted on a second surface of said varistor substrate opposite said first surface of said varistor substrate; and
said additional lead terminal is connected to said third electrode.

4. A surge absorber as recited in claim 3, wherein
a bent part is formed on one of said extended portion of said additional terminal and each of said extended portions of said lead terminals of said passive element, so as to allow said extended portions to lie in said single plane.

5. A surge absorber comprising:
a resistance element having an input side and an output side;
a first electrode connected to the input side of said resistance element;
a second electrode connected to the output side of said resistance element;
a third electrode;
a varistor element interposed between said first electrode on the input side of said resistance element and said third electrode; and
wherein no capacitance element is interposed between the output side of said resistance element and said third electrode;
wherein a first varistor green sheet is provided and has first and second opposing end edges, first and second opposing side edges and a first internal electrode extending from said first side edge to said second side edge of said first varistor green sheet;
wherein a second varistor green sheet is provided and has first and second opposing end edges, first and second opposing side edges and a second internal electrode extending from said first end edge toward said second end edge of said second varistor green sheet;
wherein said first and second varistor green sheets are laminated to one another to form at least a portion of a laminated member having first and second end edges and first and second side edges and constituting said varistor element;
wherein said first and second electrodes comprise first and second end external electrodes, respectively, which are mounted at said first and second end edges of said laminated member, respectively, and said first end external electrode is connected to said second internal electrode;
wherein first and second side external electrodes are mounted at middle portions of said first and second side edges of said laminated member, are connected to respective opposing ends of said first internal electrode, and constitute said third electrode; and
wherein said resistance element comprises a resistance electrode extending between and connected to said first and second end external electrodes.

6. A surge absorber as recited in claim 5, wherein
said resistance electrode has a shape which is asymmetric about a longitudinally central point thereof.

7. A surge absorber as recited in claim 6, wherein
wherein said resistance electrode is wider at one end thereof than at the other end thereof.

* * * * *